United States Patent [19]
Dickinson

[11] 3,802,122
[45] Apr. 9, 1974

[54] PROCESS FOR AGING AND MATURING DANDELIONS

[76] Inventor: Marian W. Dickinson, 220 E. 1st, Port Angeles, Wash. 98362

[22] Filed: Feb. 5, 1973

[21] Appl. No.: 329,820

[52] U.S. Cl.............................. 47/58, 47/55, 161/28
[51] Int. Cl.............................................. A01g 5/00
[58] Field of Search ....... 47/58, 55, DIG. 2; 161/19, 161/21, 26, 28; 156/57

[56] References Cited
UNITED STATES PATENTS
| | | | |
|---|---|---|---|
| 1,769,198 | 7/1930 | Albany | 47/55 |
| 2,350,268 | 5/1944 | Zuckerman | 47/55 |
| 2,390,858 | 12/1945 | Walker | 47/55 |
| 3,321,866 | 5/1967 | Gallo | 47/55 |
| 3,452,476 | 7/1969 | Kise | 47/55 |

*Primary Examiner*—Robert E. Bagwill
*Attorney, Agent, or Firm*—Clarence A. O'Brien; Harvey B. Jacobson

[57] ABSTRACT

Dandelions may be aged by inserting a reed into the hollow stem thereof to puncture the receptacle and thereafter heating the dandelion at a temperature in the range from about 150° to 300° F. for a time sufficient to accelerate pappus maturation.

10 Claims, 6 Drawing Figures

PROCESS FOR AGING AND MATURING DANDELIONS

The present invention relates to a process for aging and maturing dandelions.

It is an object of the present invention to provide a process for artificially initiating the aging of picked dandelions and for accelerating maturation thereof to the pappus stage.

It is another object of this invention to provide a process for rapidly aging dandelions to form a durable, plumose pappus for educational and decorative or display purposes.

Other objects and advantages will become apparent from the following description and appended claims.

Briefly stated, in accordance with the aforesaid objects, the present invention provides a process for aging dandelions including the steps of puncturing the receptacle of the dandelion and then exposing the dandelion to indirect heat for a time sufficient to cause the fluff or pappus to turn white. In a preferred embodiment of the present process, a reed or other sharp object is inserted into the hollow stem of the dandelion to puncture the receptacle, after which the dandelion is placed in an oven at 150° to 300° F. for a time sufficient for development of the pappus into a plumose white fluff.

The invention will be better understood from the following description taken in conjunction with the accompanying drawings.

Figure 1:
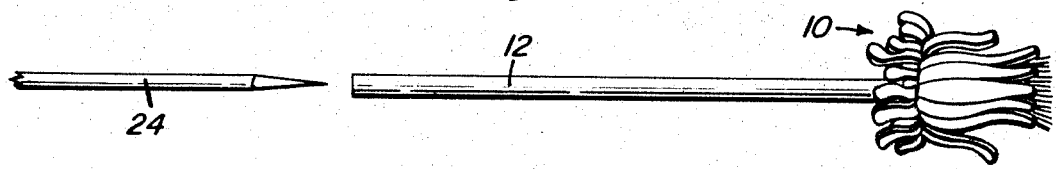
FIG. 1 is a side elevation illustrating the picked dandelion just prior to puncturing its receptacle.

Dandelions are well known, commonly available flowering plants which are members of the general family known as composites. Structurally, the dandelion 10 consists essentially of a hollow stem 12 having a receptacle 14 at the end thereof. The receptacle 14 is a more or less enlarged end of the stem 12 bearing the akenes 16 or fruit of the dandelion. The akenes 16 taper upwardly into a long thin beak 18 bearing the hairs of the pappus 20 at their summit. As is well known, the pappus 20 comprises a ring of fine, sometimes feathery hairs which cover the fruit of the plant. The involucres 22 subtend from the receptacle 14. The present process has as its object to age the dandelion and thereby to firm-up the head and cause the pappus to turn white and to form an attractive, lasting plumose fluff. In its aged state the dandelion may be displayed and used as an educational tool as well as a decorative floral element.

The present process contemplates processing either a freshly picked or preserved dandelion. Nothing need be done to a freshly picked dandelion to prepare it for processing in accordance with the present invention. However, if there is to be a significant time lapse between picking and processing, the dandelion may be preserved or kept from wilting by immersion in an aqueous solution of sugar, powdered alum and purex (basic lead sulfate, $PbSO_4 \cdot PbO$). A particularly effective solution has the relative proportions of 3 tablespoons sugar, one-third teaspoon powdered alum and one-third teaspoon purex in one quart of water.

In order to initiate the aging or maturation of the freshly picked or preserved dandelion a sharp object 24 is used to puncture the receptacle. Preferably, the sharp object is in the form of a reed or other elongated, wire-like, flexible, yet strong, object which may be inserted lengthwise into the hollow stem of the dandelion (FIG. 1). When inserted, the sharp object or reed should be sufficiently flexible to follow the natural contour of the stem yet possess the internal rigidity to penetrate the receptacle at the top of the stem. Puncturing the receptacle appears to hold or seal the akenes in the receptacle. It has been found that a Sedge reed is particularly useful as the sharp object for insertion into the stem. However, it will be appreciated that the invention is not intended to be limited to the use thereof, but rather to encompass any elongated, sharp object capable of following the contours of the hollow dandelion stem upon insertion therein and puncturing the receptacle at the top of the stem. For convenience, the term "reed" will hereinafter be applied to cover all such suitable sharp objects.

Figure 2:
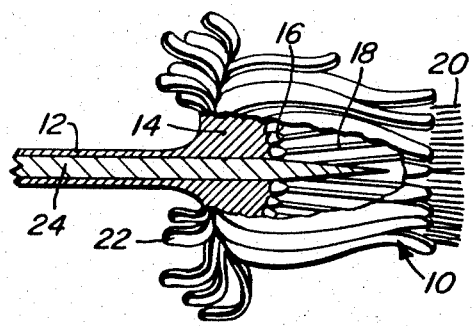
FIG. 2 is a fragmentary section with a portion broken away, showing the dandelion with a reed inserted into the hollow stem thereof and the receptacle punctured.

While the preferred form of the present invention contemplates puncturing the receptacle by insertion of a reed into the hollow stem of the dandelion, it will be appreciated, as hereinbefore indicated, that receptacle puncturing can be accomplished in any manner. However, it has been found that puncturing a receptacle with a reed in the preferred manner has at least two advantages: (1) the reed strengthens the dandelion stem and thereby renders it more suitable for subsequent display purposes; and (2) the reed helps to hold the akenes in the receptacle. FIG. 2 shows the reed 24 inserted lengthwise into the hollow stem 12 and puncturing the receptacle 14.

Puncturing the receptacle initiates the maturation or aging process as a result of which the fluff or pappus of the dandelion turns white. If time is not a critical consideration, the dandelion may be permitted to age at its own natural rate, which rate has been found to be much too slow for practical commercial purposes. Accordingly, it has been found that aging of the dandelion can be accelerated by the application thereto of controlled heat. Generally, the longer the exposure to any given heat level, the more rapidly formed and the greater or larger will be the resulting white fluff.

Figure 3:
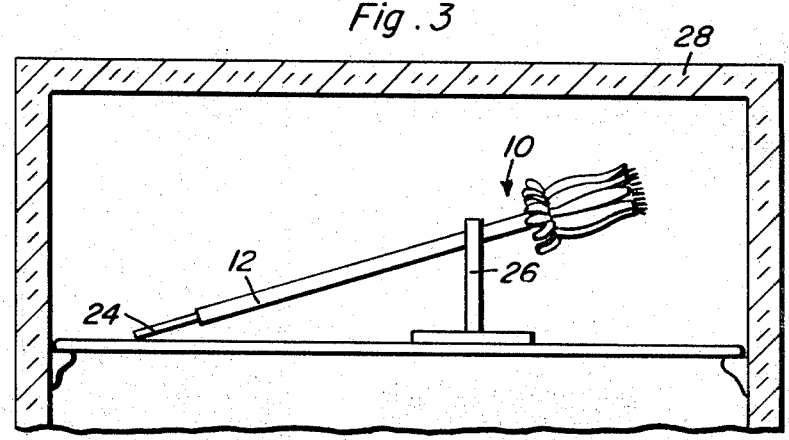
FIG. 3 is a side elevation illustrating the step of heating the dandelion to accelerate maturation thereof.
Figure 4:
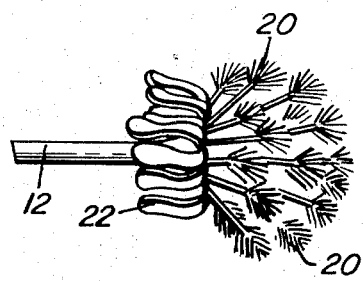
FIG. 4 is a side elevation showing the dandelion following processing in accordance with the present invention.
Figure 5:
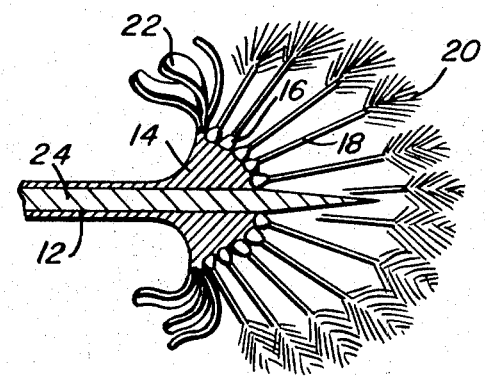
FIG. 5 is a fragmentary section of the dandelion shown in FIG. 4.

Heat should be applied to the dandelion indirectly to avoid damaging the fluff. Direct heat, such as exposing the dandelion to an open flame should be avoided. Any form of oven, or equivalent apparatus, will be suitable to expose the receptacle-punctured dandelion to controlled heat, as in FIG. 3 which shows receptacle-punctured dandelion 10 supported by bracket 26 within oven 28. Temperatures in the oven should be controlled within the range 150° to 300° F and, in that range, exposure time will be a function of temperature. Thus, exposure of the dandelion to lower temperature will require longer times to achieve the same size fluff as can be obtained using higher temperatures. The preferred exposure is at a temperature of about 200° F. for a period of about 10 minutes. It has been observed that dandelions heat-treated under these preferred conditions exhibit maximum durability for display purposes.

Figure 6:
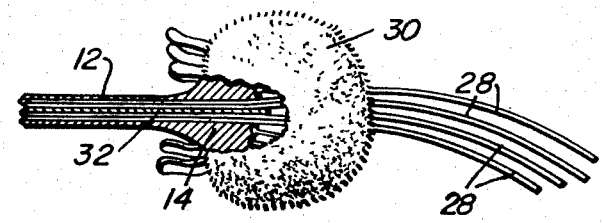
FIG. 6 is a side elevation, partly in section, showing the dandelion of FIG. 4 including a flexible wire and optic fibers in the hollow stem thereof.

Following maturation with its attendant firming-up of the head or fluff and formation of a white, plumose pappus, it may be desirable to further improve the suitability of the dandelion for display purposes. Specifically, with reference to FIG. 6, it has been found to be advantageous to insert optic fibers 28 lengthwise into the base of the hollow stem 12 and out through the head or fluff 30. By application of a high intensity light source to the fibers at the base of the stem, the optic fibers projecting through the pappus can be made to light-up or glow creating an attractive visual effect. In addition, insertion lengthwise of a flexible, thin wire 32 into the base of and through the hollow stem 12 until it just protrudes from the receptacle 14 into the fluff 30 allows the stem to be bent into various arrangements and to maintain any desired configuration.

While the present invention has been described with reference to particular embodiments thereof, it will be understood that numerous modifications can be made by those skilled in the art without actually departing from the scope of the invention. In particular, while the present process has been described in connection with the dandelion, it will be appreciated that it is equally applicable to all flowering plants of the composite family which have a pappus. Accordingly, all equivalents and modifications may be resorted to which fall within the scope of the invention as claimed.

What is claimed as new is as follows:

1. A process for aging dandelions and for sealing the achenes in the receptacle, including the step of puncturing the receptacle of the dandelion with a reed to initiate pappus maturation and fluff formation said step of puncturing being accomplished prior to opening of the involucral bracts.

2. A process, as claimed in claim 1, including the additional step of heating the receptacle-punctured dandelion to accelerate the rate of maturation.

3. A process for aging dandelions and for sealing the achenes in the receptacle, including the steps of:
   a. puncturing prior to opening of the involucral bracts the receptacle, and
   b. heating the dandelion at a temperature in the range 150° to 300° F. for a time sufficient to mature the dandelion to the pappus stage.

4. A process, as claimed in claim 3, wherein the receptacle is punctured by inserting a reed through the hollow stem of the dandelion.

5. A process, as claimed in claim 4, wherein said heating is accomplished at 200° F. for about 10 minutes.

6. A process, as claimed in claim 5, wherein the reed is a Sedge reed.

7. A process, as claimed in claim 3, including the additional step of preserving the dandelion prior to processing by immersing the dandelion in an aqueous solution of sugar, powdered alum and purex.

8. A process, as claimed in claim 7, wherein the solution comprises about 3 tablespoons sugar, one-third teaspoon powdered alum and one-third teaspoon purex per quart of water.

9. A process, as claimed in claim 4, including the additional step of inserting optic fibers through the hollow stem of the aged dandelion.

10. A process, as claimed in claim 4, including the additional step of inserting a flexible wire through the hollow stem of the aged dandelion.

* * * * *